United States Patent
Hirasaka

[19]

[11] Patent Number: 6,155,372

[45] Date of Patent: Dec. 5, 2000

[54] SUSPENSION SYSTEM FOR POWER TRAIN

[75] Inventor: Naoto Hirasaka, Susono, Japan

[73] Assignee: Toyota Jidosha Kabushiki Kaisha, Toyota, Japan

[21] Appl. No.: 09/097,618

[22] Filed: Jun. 15, 1998

[30] Foreign Application Priority Data

Jul. 11, 1997 [JP] Japan .................................. 9-186544

[51] Int. Cl.[7] ......................................................... B60K 5/12
[52] U.S. Cl. ........................... 180/297; 180/300; 248/659
[58] Field of Search ................................. 180/291, 297, 180/298, 299, 300, 312; 248/659

[56] References Cited

U.S. PATENT DOCUMENTS

| | | | |
|---|---|---|---|
| 800,915 | 10/1905 | Hewitt | 180/299 |
| 1,103,524 | 7/1914 | Marmon | 180/291 |
| 4,240,517 | 12/1980 | Harlow, Jr. et al. | 180/300 X |
| 4,263,980 | 4/1981 | Harlow, Jr. et al. | 180/299 X |
| 4,449,603 | 5/1984 | Langwieder et al. | 180/291 X |
| 4,494,723 | 1/1985 | Kobuki et al. | 180/312 X |
| 4,516,545 | 5/1985 | Kumagai et al. | 180/312 X |
| 4,583,503 | 4/1986 | Kumagai et al. | 180/312 X |
| 4,618,023 | 10/1986 | Norlin | 180/312 |
| 4,648,576 | 3/1987 | Matsui | 180/300 |
| 4,821,828 | 4/1989 | Schwerzler et al. | 180/300 X |
| 4,901,814 | 2/1990 | Van Brook et al. | 180/300 X |
| 4,930,743 | 6/1990 | Ishimaru et al. | 180/291 X |
| 5,035,296 | 7/1991 | Sjostrand | 180/312 X |
| 5,129,479 | 7/1992 | Fujii et al. | 180/297 |
| 5,205,374 | 4/1993 | Love et al. | 180/300 |
| 5,267,630 | 12/1993 | Watanabe et al. | 180/312 X |

FOREIGN PATENT DOCUMENTS

| | | |
|---|---|---|
| 0 279 875 | 8/1988 | European Pat. Off. . |
| 0 332 861 | 9/1989 | European Pat. Off. . |
| 725 478 | 8/1942 | Germany . |
| 3182837 | 8/1991 | Japan . |
| 61151 | 1/1994 | Japan . |

OTHER PUBLICATIONS

Patent Abstracts of Japan, vol. 012, No. 400 (M–756), Oct. 24, 1988 & JP 63 145124 A (Mazda Motor Corp.), Jun. 17, 1988.

*Primary Examiner*—Michael Mar
*Attorney, Agent, or Firm*—Kenyon & Kenyon

[57] ABSTRACT

It is an object of the present invention to provide a suspension system for a power train in which vehicle vibration when idling can be reduced and thus improves in giving more comfort in riding in the vehicle.

A power train assembled an engine and a transmission is supported by a left side mount, a right side mount, a front mount and a rear mount, from a body frame. The left side mount and the right side mount are located in the front direction than the vertical surface including the roll main axis of inertia of the power train.

2 Claims, 3 Drawing Sheets

SUSPENSION SYSTEM FOR POWER TRAIN

BACKGROUND OF THE INVENTION

1. Field of the Invention

The present invention relates to a suspension system for supporting a power train in a vehicle from a vehicle body and more particularly, relates to a suspension system for a power train mounted transversely in a front and rear direction of the vehicle.

2. Description of the Related Art

When a power train assembled an engine and a transmission is mounted transversely in a front and rear direction of a vehicle, that is, crank shafts are mounted orthogonally in a front and rear direction of a vehicle, one example of a system for suspending the power train from the vehicle body is that mounts which support mainly a static load of the power train are mounted in a left and right of the power train which is on the vertical surface including a main axis of inertia in a rolling direction of power train (hereinafter, referred to as a roll main axis of inertia). Hereinafter, this system is referred to as a main axis of inertia mount system.

Here, a main axis of inertia is an axis, when a rigid body is rotated around an axis, that does not generate a moment which tends to change a direction of the rotational axis rotating with the rigid body in viewing from a coordinate axis. A roll main axis of inertia is inherent to a power train and passes the center of gravity of the power train.

Japanese Patent Laid-Open Publication No. 6-1151 discloses a main axis of inertia mount system, in which, in addition to the left and right mounts for supporting the static load of the power train, mounts absorbing a torque reaction force of the power train are provided in a front and rear direction of the power train and are called a front mount and a rear mount.

However, as described in the publication, it is well-known that when idling, influences to the vehicle vibration of vibration input to the front mount are big. As shown in FIG. 6, a vibration mode of a body frame is a two-section flexural vibration mode. This is because that in the vicinity of the power train, the closer to the extremity of the body frame is, the higher the sensitivity becomes. In FIG. 6, the solid line shows a frame of the body frame when an engine stops, while the short dash line shows a vibration mode of the body frame when idling.

Therefore, to increase the roll rigidity in the main axis of inertia mount system, it is advantageous for an idle vibration to make a spring constant in an up and down direction of the rear mount bigger than in an up and down direction of the front mount. This is because that if the spring constant of the front mount in the up and down direction make bigger, the influence to the vehicle vibration when idling becomes big.

Therefore, in the main axis of inertia mount system, it is considered to make the spring constant of the rear mount in the up and down direction bigger than the front mount in the up and down direction.

However, if the spring constant of the front mount and the rear mount are set as mentioned above, an elastic main axis in the roll direction (hereinafter, referred to as a roll elastic main axis) does not pass the center of gravity of the power train due to unbalancing of the spring in a suspension system. As a result, problems occur that a vehicle vibration when idling or a vehicle vibration accompanying with a cranking vibration generated when an engine is started become worse.

Here, an elastic main axis is an axis, when power is added along a particular axis in a spring device (suspension device), a direction of the power and a direction of the elastic displacement are coincided and does not generate an angular displacement. The elastic main axis only concerns with strength and placement of the spring and does not concern with mass or a center of gravity.

SUMMARY OF THE INVENTION

It is therefore an object of the present invention to provide a suspension system for a power train which reduces vehicle vibrations due to idle vibration, etc. to supplement balance of the spring of the suspension system by mounting mounts for supporting a static load of the power train in the front direction than the vertical surface which passes the roll main axis of inertia.

The above-described object is attained by the following means that (1) the suspension system for the power train according to the present invention is a suspension system that supports a power train from a vehicle body which is mounted transversely in a front and rear direction of a vehicle, comprising;

an engine side mount and a transmission side mount for supporting a static load of the power train located at the engine and the transmission sides positioned at the left and right of the power train which is in the vicinity of the vertical surface including the roll main axis of inertia of the power train; and a front mount and a rear mount for absorbing a torque reaction force of the power train located in the front and rear direction of the power train;

wherein the rear mount has a spring constant bigger than the front mount and at least either the engine side mount or the transmission side mount is located in the front direction of the vehicle than the vertical surface including the roll main axis of inertia.

Either the engine side mount or the transmission side mount located in the front direction than the vertical surface including the roll main axis of inertia reduces vehicle vibrations so as to supplement unbalance between the front mount and the rear mount occurred to increase a roll rigidity.

Moreover, the invention can be accomplished by mounting either the engine side mount or the transmission side mount to the right or left of the power train.

(2) Further, the suspension system for the power train according to the present invention, as the premises of the above structure (1), the engine side mount is located in the rear direction of the vehicle than the vertical surface including the roll main axis of inertia, the transmission side mount is located in the front direction of the vehicle than the vertical surface including the roll main axis of inertia and the engine side mount is set the spring constant smaller than the transmission side mount.

Since the engine vibration input is bigger in the engine side mount than in the transmission side mount, by this structure enables to reduce the noise in the engine.

DESCRIPTION OF THE PREFERRED EMBODIMENT

Preferred embodiments according to the present invention of the suspension system for the power train will now be described with reference to the accompanying FIGS. 1 to 5. The following embodiments are mode in a front engine-front drive (FF) type vehicle. In FIGS. 1 to 4, Fr denotes a front direction of a vehicle and RH denotes a right direction of a vehicle.

<Embodiment 1>

Figure 1:
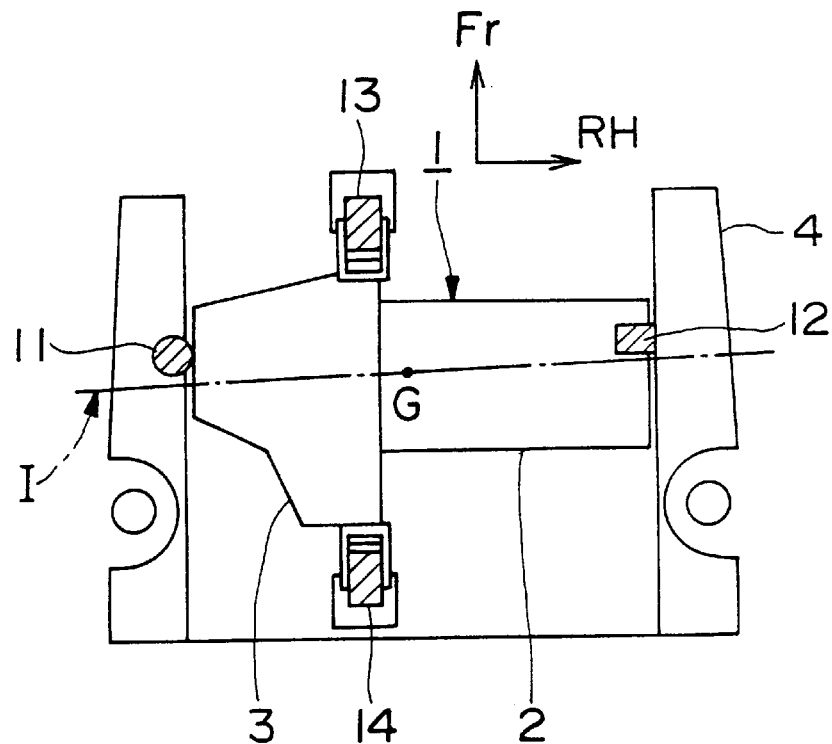
FIG. 1 is a plan view of a suspension system in accordance with a first embodiment of the present invention.

FIG. 1 shows a plan view of the suspension system for the power train in the FF type vehicle in a first embodiment. The power train 1 is assembled an engine 2 and a transmission 3 and is mounted transversely in a front and rear direction of a vehicle. In other words, crank shafts (not shown) of the engine 2 are located along to the orthogonal direction in the front and rear direction of the vehicle. The transmission 3 is located in the left side of the engine 2. In the drawings, G denotes a center of gravity of the power train 1.

The power train 1 is supported by four mounts, that is, a left side mount 11, a right side mount 12, a front mount 13 and a rear mount 14, installed in a body frame (vehicle body) 4 of the vehicle.

The left side mount 11 and the right side mount 12 are mainly for supporting the static load of the power train 1 and are located in the front direction of the vehicle 12 dislocated a predetermined amount than the vertical surface including the roll main axis of inertia I of the power train 1. The left side mount 11 is located in the left direction of the vehicle which is the transmission side and the right side mount 12 is located in the right direction of the vehicle which is the engine side. In other words, in this embodiment, the left side mount 11 constitutes the transmission side mount and the right side mount 12 constitutes the engine side mount.

The front mount 13 and the rear mount 14 are mainly for absorbing a torque reaction force of the power train 1. The front mount 13 is located in a front direction of the power train 1 and the rear mount 14 is in the rear direction of the power train 1.

In the suspension system, the spring constant in the up and down direction of the rear mount 14 is set bigger than the spring constant of the up and down direction of the front mount 13 so as to increase the roll rigidity. The reason that the spring constant in the up and down direction of the front mount 13 is set not big is that, when idling, the influences to the vehicle vibration is bigger in the vibration input to the front mount 13 than in the vibration input to the rear mount 14.

Thus constructed suspension system enables to reduce both the vehicle vibration accompanied by a cracking vibration generated at the time of starting the engine and the vehicle vibration of idling state. The left side mount 11 and the right side mount 12 located in the front direction than the vertical surface including the roll main axis of inertia I supplement the unbalance of the front mount 13 and the rear mount 14. As a result, the roll elastic main axis passes the center of gravity G or the near thereof, the roll vibration of the power train 1 and the movement of the vertical direction of the center of gravity G of the power train 1 become approximately uncouple so as to greatly reduce a displacement of the vertical direction of the center of gravity G of the power train 1 to the roll input of the power train 1.

Moreover, this improves in giving more comfort in riding when driving a rough ground. By uncoupling the roll vibration of the power train 1 and the movement of the vertical direction of the center of gravity G of the power train 1, suppresses occurrence of the roll vibration of the power train 1 due to the up and down vibration input from the road and also actions of the center of gravity G of the power train 1 accompanied by the road input.

<Embodiment 2>

Figure 2:
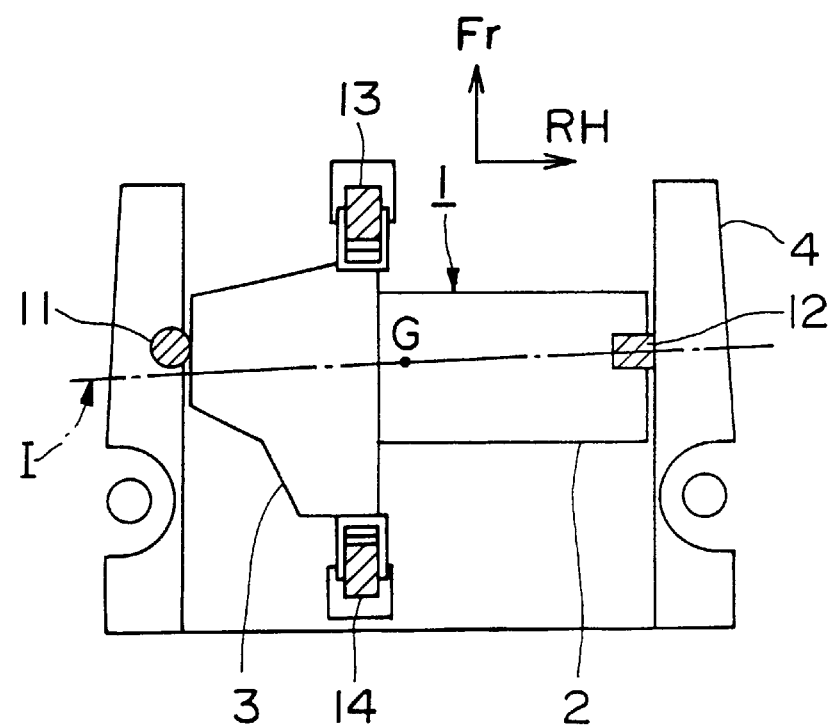
FIG. 2 is a plan view of a suspension system in accordance with a second embodiment of the present invention.

FIG. 2 is a plan view showing a second embodiment of the suspension system of the power train.

The second embodiment exemplifies that the right side mount 12 is located on the vertical surface including the roll main axis of inertia I of the power train 1 and the left side mount 11 only is located in the front direction than the vertical surface including the roll main axis of inertia I of the power train 1.

In this suspension system according to the second embodiment also reduces the vehicle vibration accompanied by the cranking vibration of low frequency generated when starting the engine and the vehicle vibration of idling state, thus resulting in improvement of giving more comfort in riding in the vehicle.

<Embodiment 3>

Figure 3:
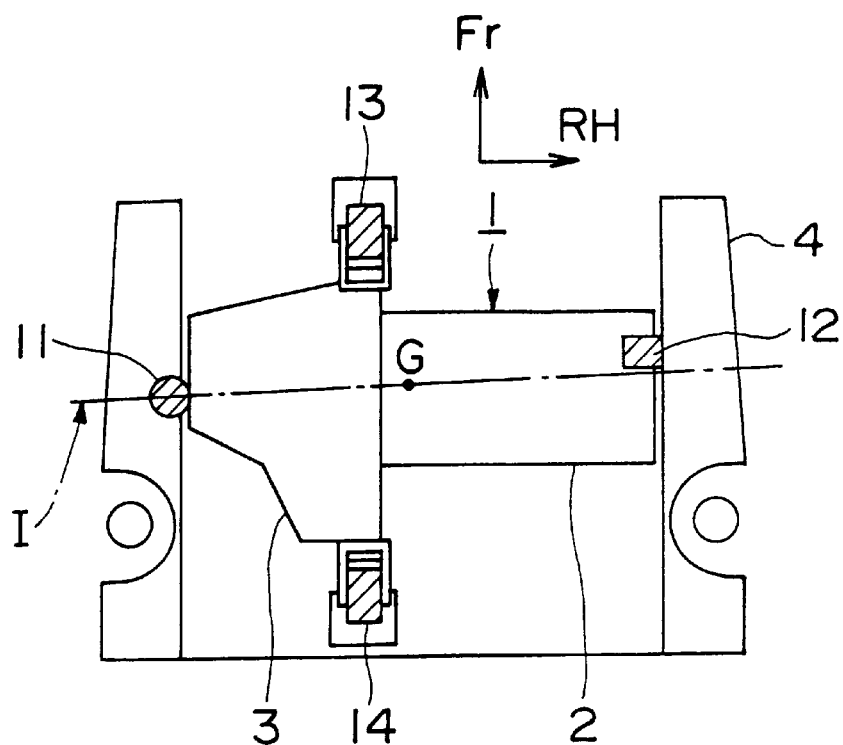
FIG. 3 is a plan view of a suspension system in accordance with a third embodiment of the present invention.

FIG. 3 is a plan view showing a third embodiment of the suspension system of the power train.

The third embodiment exemplifies that the left side mount 11 is located on the vertical surface including the roll main axis of inertia I of the power train 1 and the right side mount 12 only is located in the front direction than the vertical surface including the roll main axis of inertia I of the power train 1.

In this suspension system according to the third embodiment also reduces the vehicle vibration accompanied by the cranking vibration of low frequency generated when starting the engine and the vehicle vibration of idling state, thus resulting to improve in giving more comfort in riding in the vehicle.

<Embodiment 4>

Figure 4:
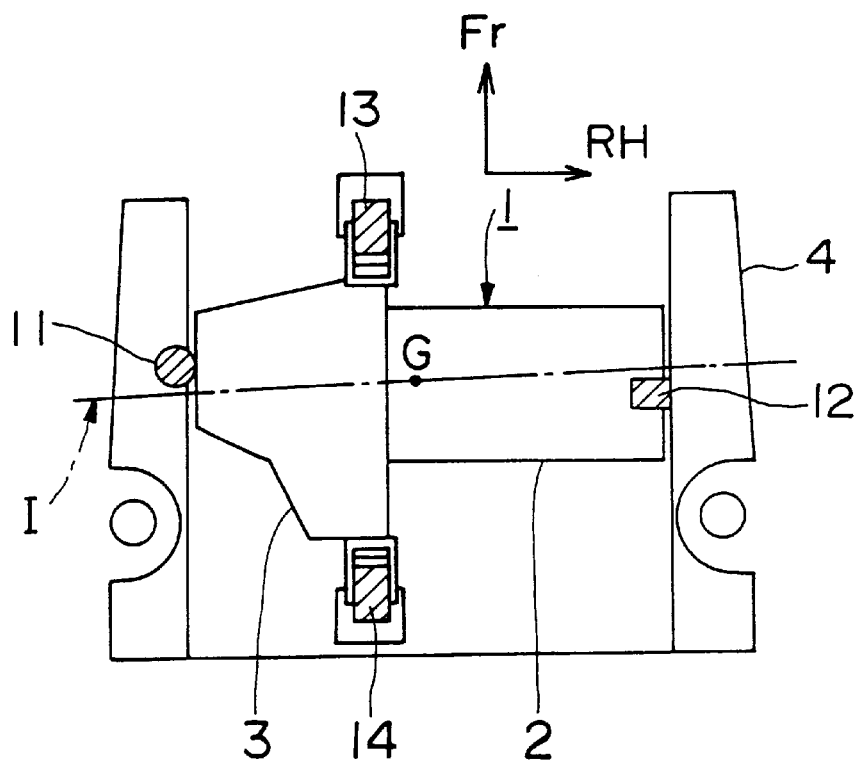
FIG. 4 is a plan view of a suspension system in accordance with a fourth embodiment of the present invention.

FIG. 4 is a plan view showing a fourth embodiment of the suspension system of the power train.

In the fourth embodiment, the left side mount 11 is located in the front direction than the vertical surface including the roll main axis of inertia I of the power train 1 and the right side mount 12 is located in the rear direction than the vertical surface including the roll main axis of inertia I of the power train 1. The spring constant in the up and down direction of the right side mount 12 is set smaller than the spring constant in the up and down direction of the left side mount 12 and the roll elastic main axis of the left side mount 11 and the right side mount 12 is located in the front direction than the main axis of inertia I of the power train 1. The reasons for this setting are explained below.

Since the right side mount 12 is located near the engine 2, the engine vibration input is bigger than the left side mount 11 located far from the engine 2. Moreover, as mentioned above, in the vicinity of the power train 1, the sensitivity becomes higher as the body frame 4 is closer to the extremity thereof.

Thus, when the spring constant in the up and down direction of the right side mount 12 is smaller than the spring constant in the up and down direction of the left side mount 11 and the right side mount 12 is located in the rear direction than the vertical surface including the roll main axis of inertia I, the noise filled in the engine 2 transmitted to the body frame 4 through the right side mount 12 can be reduced.

Moreover, by the arrangement that the left side mount 11 is located in the front direction than the vertical surface including the roll main axis of inertia I of the power train 1 and the roll elastic main axis of the left side mount 11 and the right side mount 12 is located in the front direction than the roll main axis of inertia I of the power train 1, unbalance between the front mount 13 and the rear mount 14 can be supplemented so that the roll vibration of the power train 1 and the movement of the translational direction of the center of gravity G of the power train 1 can be approximately uncoupled.

Therefore, in the suspension system of the fourth embodiment, the vehicle vibrations accompanied with the cranking vibration of the low frequency generated when starting the engine and the idling state can be reduced, thus improving in giving more comfort in riding in the vehicle.

<Experimental result>

Figure 5:
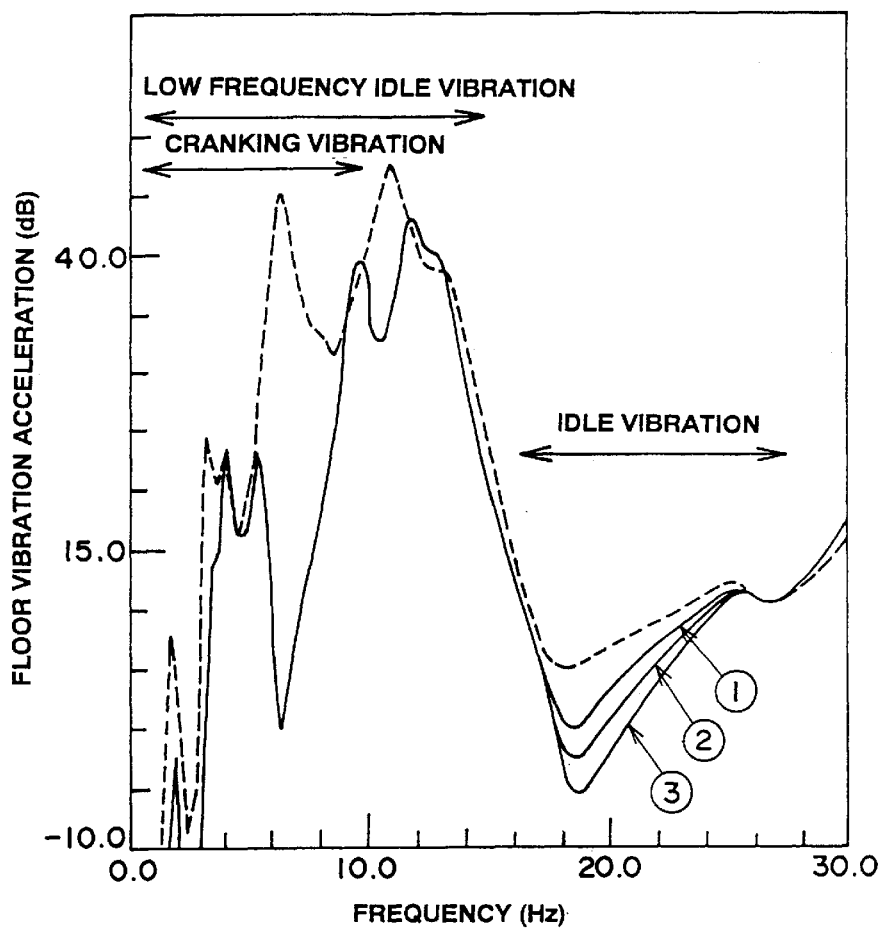
FIG. 5 is a chart showing floor vibration of a suspension system for a power train.
Figure 6:
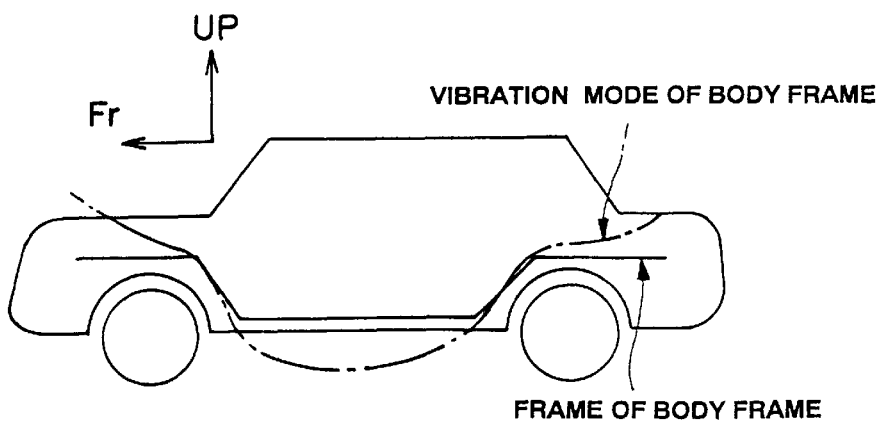
FIG. 6 illustrates a vibration mode of a body frame when idle vibration.

FIG. 5 shows a result searched on vibration of a vehicle floor by experiment using actual vehicles. The axis of abscissa is a vibration frequency of the power train 1 and the axis of ordinate is acceleration of a floor vibration. Here, the vibration frequency is times of explosion of the engine 2 per second.

In the figure, the broken line shows the conventional main axis of inertia mount system. The solid line ① shows the mode of the first embodiment, the solid line ② shows the mode of the second and third embodiments and the solid line ③ shows the mode of the fourth embodiment.

As from the experimental result of the first, second, third and fourth embodiments, it is proved that the vehicle vibration accompanied by cranking vibration generated when the engine starts or the vehicle vibration of idling state can be reduced as compared with conventional ones.

As explained, according to the present invention, it is provided a suspension system for a power train comprising: an engine side mount and a transmission side mount mainly supporting a static load of the power train which are positioned at a left and right of the power train in the engine side and the transmission side in the vicinity of the vertical surface including the roll main axis of inertia of the power train and a front mount and a rear mount for absorbing a torque reaction force of the power train which are located in a front and rear direction of the power train, wherein the rear mount has a spring constant bigger than the front mount and at least either the engine side mount or the transmission side mount is located in the front direction of the vehicle than the vertical surface including the roll main axis of inertia. Thus, the vehicle vibration when idling can be reduced and the effect in improvement of giving more comfort in riding in the vehicle is brought.

Further, in a suspension system for the power train, when the engine side mount is located in the rear direction of the vehicle than the vertical surface including the roll main axis of inertia, the transmission side mount is located in the front direction of the vehicle than the vertical surface including the roll main axis of inertia and the spring constant is set smaller in the engine side mount than in the transmission side mount, thus the effect that reduces the noise filled in the engine is brought.

What is claimed is:

1. A suspension system for supporting a power train which includes an engine and a transmission mounted transversely in a vehicle body, the power train having a front side facing a forward direction of the vehicle and a rear side facing a rearward direction of the vehicle comprising:

an engine side mount attached to the engine end of the power train and a transmission side mount attached to the transmission end of the power train for supporting a static load of the power train within the vehicle body, where the engine side mount and the transmission side mount are located near a transverse vertical plane which includes a roll main axis of inertia of the power train; and a front mount attached to the vehicle body and a rear mount attached to the vehicle body for absorbing a torque reaction force of the power train, said front mount located in front of the front side of the power train and said rear mount located to the rear of a rear side of the power train;

wherein the rear mount has a spring constant which is higher than a spring constant of the front mount and at least one of the engine side mount and the transmission side mount is located, with respect to the forward direction of the vehicle, in front of said vertical plane including the roll main axis of inertia.

2. A suspension system for the power train according to claim 1, wherein the engine side mount is located, with respect to the forward direction of the vehicle, to the rear of said vertical plane including the roll main axis of inertia, the transmission side mount is located, with respect to the forward direction of the vehicle, in front of said vertical plane including the roll main axis of inertia and a spring constant of the engine side mount is lower than a spring constant of the transmission side mount.

* * * * *